United States Patent
Economaki

(10) Patent No.: US 8,544,372 B2
(45) Date of Patent: Oct. 1, 2013

(54) MANUAL TABLE SAW AND BLADE THEREFOR

(76) Inventor: John J. Economaki, Lake Oswego, OR (US)

( * ) Notice: Subject to any disclaimer, the term of this patent is extended or adjusted under 35 U.S.C. 154(b) by 286 days.

(21) Appl. No.: 12/920,376

(22) PCT Filed: Mar. 4, 2009

(86) PCT No.: PCT/US2009/036011
§ 371 (c)(1),
(2), (4) Date: Aug. 31, 2010

(87) PCT Pub. No.: WO2009/111552
PCT Pub. Date: Sep. 11, 2009

(65) Prior Publication Data
US 2011/0000353 A1     Jan. 6, 2011

Related U.S. Application Data

(60) Provisional application No. 61/033,784, filed on Mar. 4, 2008.

(51) Int. Cl.
*B26D 7/01* (2006.01)

(52) U.S. Cl.
USPC ........ 83/435.15; 83/856; 83/435.11; 144/287

(58) Field of Classification Search
USPC . 83/614, 401, 409, 781, 471, 435.11–435.16, 83/856–858; 483/28; 76/76; 269/55, 56, 269/58, 308
See application file for complete search history.

(56) References Cited

U.S. PATENT DOCUMENTS

| | | | | |
|---|---|---|---|---|
| 161,920 A | * | 4/1875 | Witmber | 83/857 |
| 2,346,961 A | * | 4/1944 | Lamb et al. | 30/376 |
| 2,913,025 A | * | 11/1959 | Richards | 144/1.1 |
| 2,974,693 A | * | 3/1961 | Goldschmidt et al. | 83/426 |
| 4,111,409 A | * | 9/1978 | Smith | 269/304 |
| 4,164,882 A | * | 8/1979 | Mericle | 83/409 |
| 4,336,733 A | * | 6/1982 | Macksoud | 83/477.2 |
| 4,590,837 A | | 5/1986 | Nanba | |

(Continued)

OTHER PUBLICATIONS

Rockler Woodworking and Hardware, Depth Adjustable Dozuki Saw, http://www.rockler.com/product.cfm?page=10817&cookietest=1, visited Feb. 17, 2008, 1 page.

(Continued)

*Primary Examiner* — Andrea Wellington
*Assistant Examiner* — Brendan Ayer
(74) *Attorney, Agent, or Firm* — Stoel Rives LLP

(57) ABSTRACT

A cutting device (10) includes a sled (12) guided on a base (14) for reciprocating linear movement along a blade (20) that is supported on the base below the sled and includes an inclined working edge (28) projecting beyond the sled. The sled is manually movable while the blade is held stationary, so that a workpiece supported on the sled is conveyed against and along the working edge for cutting the workpiece. Mechanisms for adjusting the blade height, inclination angle, and bevel angle are also disclosed. Novel saw blades are also disclosed, and preferably include a blade extension extending from the working edge beyond the maximum travel of the sled. The blade extension may remain in the kerf at the end of a cutting stroke, preventing the blade from jamming against the workpiece upon a return stroke and may also provide an unobstructed means by which to gage blade angle relative to the sled.

23 Claims, 10 Drawing Sheets

(56) References Cited

U.S. PATENT DOCUMENTS

| | | | |
|---|---|---|---|
| 5,020,578 A * | 6/1991 | Jennings | 144/145.1 |
| 5,404,779 A | 4/1995 | Break | |
| 5,720,213 A | 2/1998 | Sberveglieri | |
| 5,745,999 A * | 5/1998 | Zirkiev | 30/278 |
| 5,842,400 A | 12/1998 | McIntosh | |
| 6,817,275 B1 * | 11/2004 | Chin-Chin | 83/435.11 |
| 7,066,068 B1 * | 6/2006 | Caldwell | 83/435 |
| 7,337,701 B2 * | 3/2008 | Smith | 83/438 |
| 7,694,615 B2 * | 4/2010 | DiPietro | 83/425.3 |
| 7,752,951 B2 * | 7/2010 | Ouellette | 83/477.2 |
| 2001/0032534 A1 * | 10/2001 | Ceroll et al. | 83/473 |
| 2003/0089212 A1 * | 5/2003 | Parks et al. | 83/473 |
| 2005/0160895 A1 * | 7/2005 | Garcia et al. | 83/581 |
| 2006/0201296 A1 * | 9/2006 | Kuo | 83/435.12 |
| 2006/0283299 A1 * | 12/2006 | Mellen et al. | 83/401 |
| 2007/0272066 A1 * | 11/2007 | Phillips et al. | 83/435.11 |
| 2008/0284081 A1 * | 11/2008 | Smith | 269/74 |
| 2009/0123623 A1 * | 5/2009 | Tweg | 426/518 |
| 2012/0000339 A1 * | 1/2012 | Koegel | 83/856 |

OTHER PUBLICATIONS

Dieter Schmid—Fine Tools, Dozuki—Japanese Backed Saw, http://www.fine-tools.com/dozuki.htm, visited Feb. 17, 2008, 4 pages.

Nakaya Co., Ltd., Japanese Saw Teeth Types, http://www.nakaya-saw.com/english/hand_saws.htm, visited Feb. 17, 2008, 1 page.

Nakaya Co., Ltd., Saw Cutting Machinery, http://www.nakaya-saw.com/english/equipment.htm, visited Feb. 17, 2008, 1 page.

Wikipedia, Backsaw, http://en.wikipedia.org/wiki/Backsaw, visited Feb. 17, 2008, 3 pages.

Wikipedia, Japanese Saw, http://en.wikipedia.org/wiki/Japanese_saw, visited Feb. 17, 2008, 2 pages.

Wikimedia Commons, Japanese Saw Dozuki, http://commons.wikimedia.org/wiki/Image:Jap_saw_Dozuki_P2100027.JPG, visited Feb. 17, 2008, 1 page.

International Searching Authority, International Search Report and Written Opinion, International Patent Application No. PCT/US09/036011, dated Jun. 1, 2009, 7 pages.

* cited by examiner

MANUAL TABLE SAW AND BLADE THEREFOR

RELATED APPLICATION

This application claims the benefit under 35 U.S.C. §119 (e) from U.S. Provisional Patent Application No. 61/033,784, filed Mar. 4, 2008, which is incorporated herein by reference.

TECHNICAL FIELD

The field of the present disclosure relates to cutting devices referred to herein as manual table saws, to saw blades and cutting implements for such cutting devices, and to methods of cutting using such devices.

BACKGROUND

Professional and hobby woodworkers rely primarily on powered saws, such as circular table saws, jig saws, band saws, radial arm saws, and the like, to accurately cut wood joints. The present inventor has recognized that many of the hand and finger accidents experienced by woodworkers are due to work-holding risks associated with wood that is too small to safely cut on powered saws. Accordingly, there exists a need for an improved cutting device.

SUMMARY

A cutting device in the form of a manual table saw includes a sled that is guided on a base for reciprocating movement relative to the base along a linear guide path aligned with an elongate blade. The blade is supported on the base below a workpiece-supporting surface of the sled and includes a working edge that extends beyond the sled surface. The sled is manually movable along the blade while the blade is held stationary on the base so that a workpiece supported on the sled is conveyed against the working edge of the blade for cutting the workpiece.

A blade height adjusting mechanism is described for selectively moving the blade relative to the sled surface along a cutting plane of the blade to increase a cutting depth of the blade. In a preferred embodiment, the table saw includes a blade pitch adjusting mechanism for changing an inclination angle of the working edge of the blade relative to the guide path. Adjustable blade inclination allows a user to control the cutting load of the saw blade and the depth of each cutting stroke, facilitating efficient cutting of workpieces having different hardness, densities, and sizes.

In a preferred embodiment, a blade-supporting keel assembly is movable relative to the base along an arcuate path to allow a user to change a bevel angle of the blade. The blade may be retractable below the sled surface for storage or transport—table saws according to the present disclosure preferably being lightweight and man-portable.

Manual table saws according to certain embodiments disclosed utilize a very thin crosscut saw blade to reduce friction and enhance cutting efficiency, resulting in surprisingly deep, precise cuts having a very narrow kerf. Depending on the size and type of workpiece material, cuts having a depth of up to one-half inch (approximately 1.25 cm) or more may be made in a single pass of the workpiece over the blade without power, for example. Manual table saws according to the present disclosure are relatively quiet, clean, accurate, and efficient, and can be manually operated without electricity or another source of power. They generally take up less space and are safer than conventional table saws of the kind including a powered rotating circular saw blade, making them an especially attractive option for home woodworking, model making, cabinetry, trim carpentry, frame making, and other fine woodworking.

Saw blades for use with a manual table saw or other cutting device are also disclosed. In preferred embodiments the saw blade includes fine teeth along an inclined working edge (cutting edge) that extends lengthwise along the blade body and ends between opposing ends of the blade body. A blade extension extends beyond the working edge to a distal end of the blade, and includes a relief edge that extends away from the working edge toward the distal end and declines toward a back of the blade opposite the working edge. When the saw blade is installed in a cutting device of the kind described above, the blade extension extends beyond the maximum travel of a workpiece-pushing surface of the sled so that at least a portion of the blade extension remains in the kerf at the end of a full cutting stroke, preventing the blade from jamming against the workpiece upon a return stroke of the sled. In a preferred embodiment, the blade includes mounting slots spaced apart along the back of the blade for removably mounting the blade in a rigid blade spine.

Saw blades according to embodiments disclosed are similar to blades used in a Japanese saw (nokogiri, 鋸) and include a very thin blade body to reduce friction during the cutting stroke. The blade body thickness is desirably less than 1.0 mm and more desirably between approximately 0.2 mm and approximately 0.5 mm, although thinner and thicker blades may be used. Preferred embodiments include fine-pitch crosscut teeth having a tooth spacing of between approximately 0.8 mm to approximately 0.9 mm (pitch of approximately 28 to 32 teeth per inch (tpi)), although different tooth types and spacing may be used in alternative embodiments.

Additional aspects and advantages will be apparent from the following detailed description of preferred embodiments, which proceeds with reference to the accompanying drawings.

BRIEF DESCRIPTION OF THE DRAWINGS

Non-exhaustive embodiments are described below with reference to the following figures, in which like reference numerals identify like elements. The terms front, back, top, bottom, left, right, up, down, and the like, are used with reference to the drawings for convenience and do not require a particular orientation of the embodiments described, except as expressly noted.

DETAILED DESCRIPTION OF PREFERRED EMBODIMENTS

Throughout the specification, reference to "one embodiment," "an embodiment," or "some embodiments" means that a particular described feature, structure, or characteristic is included in at least one embodiment. Thus appearances of the phrases "in one embodiment," "in an embodiment," or "in some embodiments" in various places throughout this specification are not necessarily all referring to the same embodiment.

Furthermore, the described features, structures, characteristics, and methods may be combined in any suitable manner in one or more embodiments. Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments.

Figure 1:
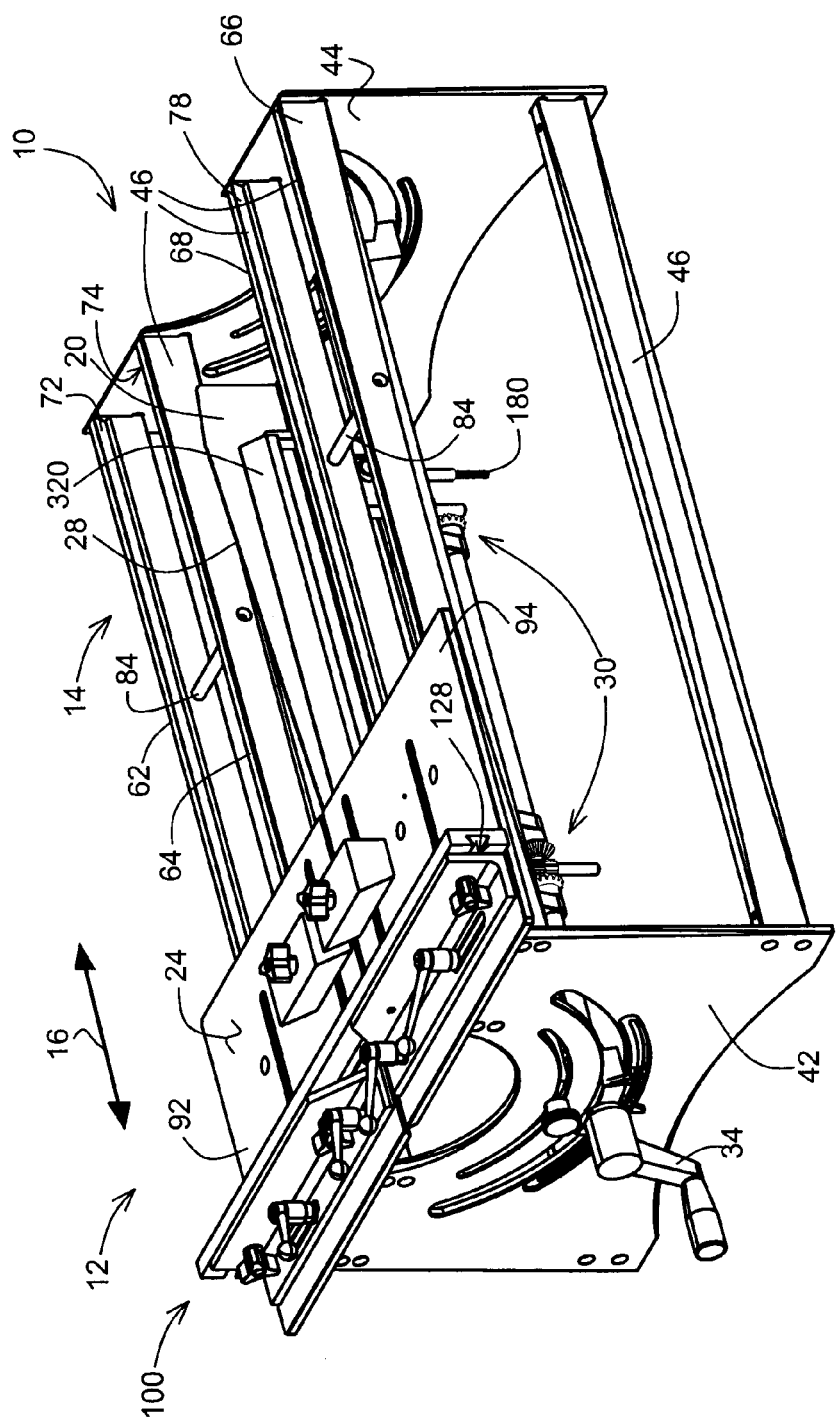
FIG. 1 is a trimetric view of a manual table saw in accordance with a preferred embodiment.

FIG. 1 is a trimetric view of a cutting device in the form of a manual table saw 10 according to a preferred embodiment. With reference to FIG. 1, table saw 10 includes a sled 12 movably supported on a frame 14 or other base structure and guided along a linear guide path (indicated by arrows 16) that is aligned with an elongate blade 20. Blade 20 is supported on frame 14 below a workpiece-supporting table surface 24 of sled 12, and includes a working edge 28 that extends beyond table surface 24. Sled 12 is manually movable along blade 20 while blade 20 is held stationary relative to frame 14 so that a workpiece (not illustrated) supported on sled 12 is conveyed against and along working edge 28 for cutting the workpiece. A blade height adjusting mechanism 30, further described below with reference to FIG. 3, is operated by a crank 34 to selectively move blade 20 relative to table surface 24 and transversely of guide path 16 to thereby position working edge 28 further beyond table surface 24, which thereby increases a cutting depth of blade 20.

Figure 4:
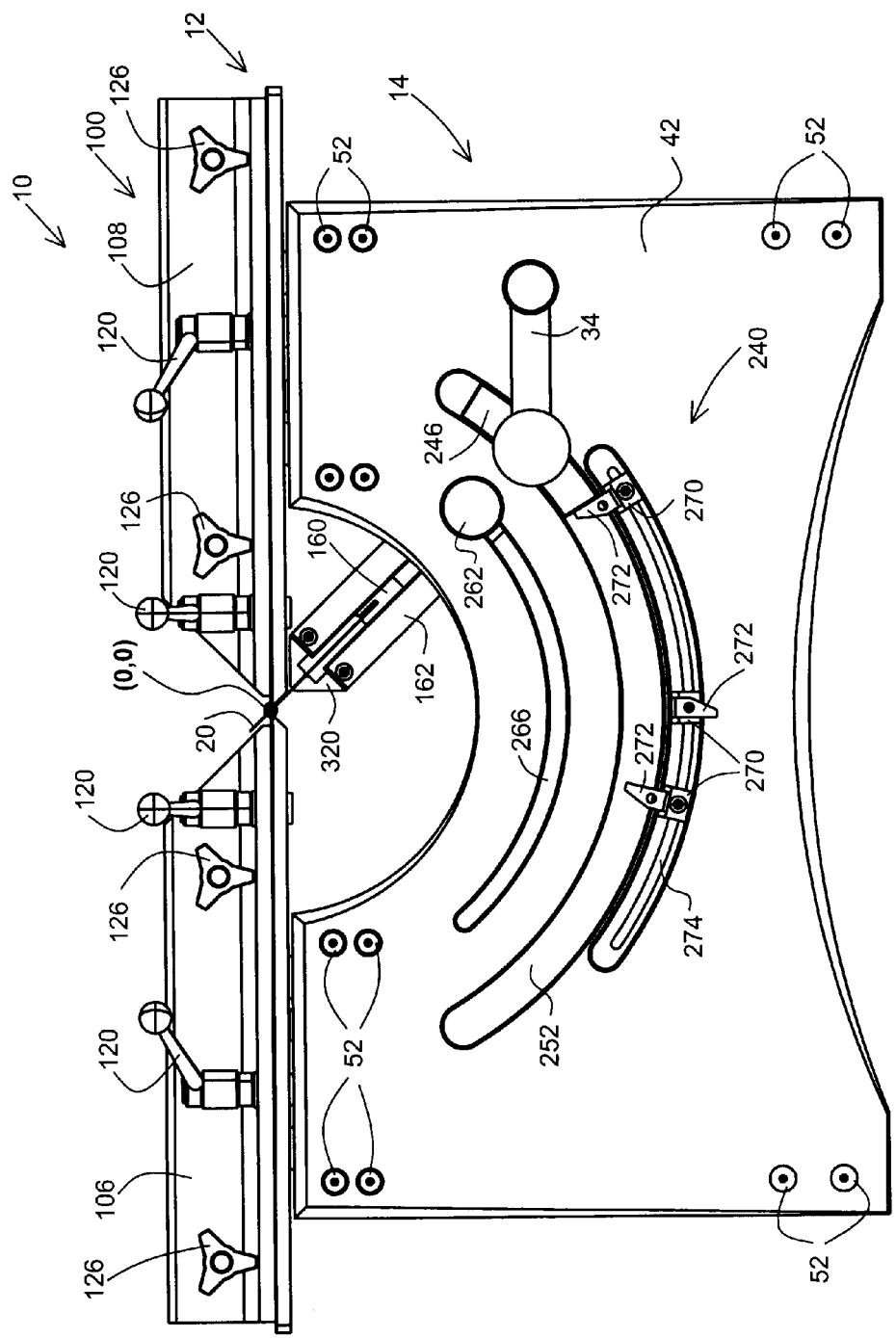
FIG. 4 is a front elevation view of the table saw of FIG. 1 showing a blade and supporting keel assembly adjusted to a bevel angle of approximately 45 degrees.
Figure 5:
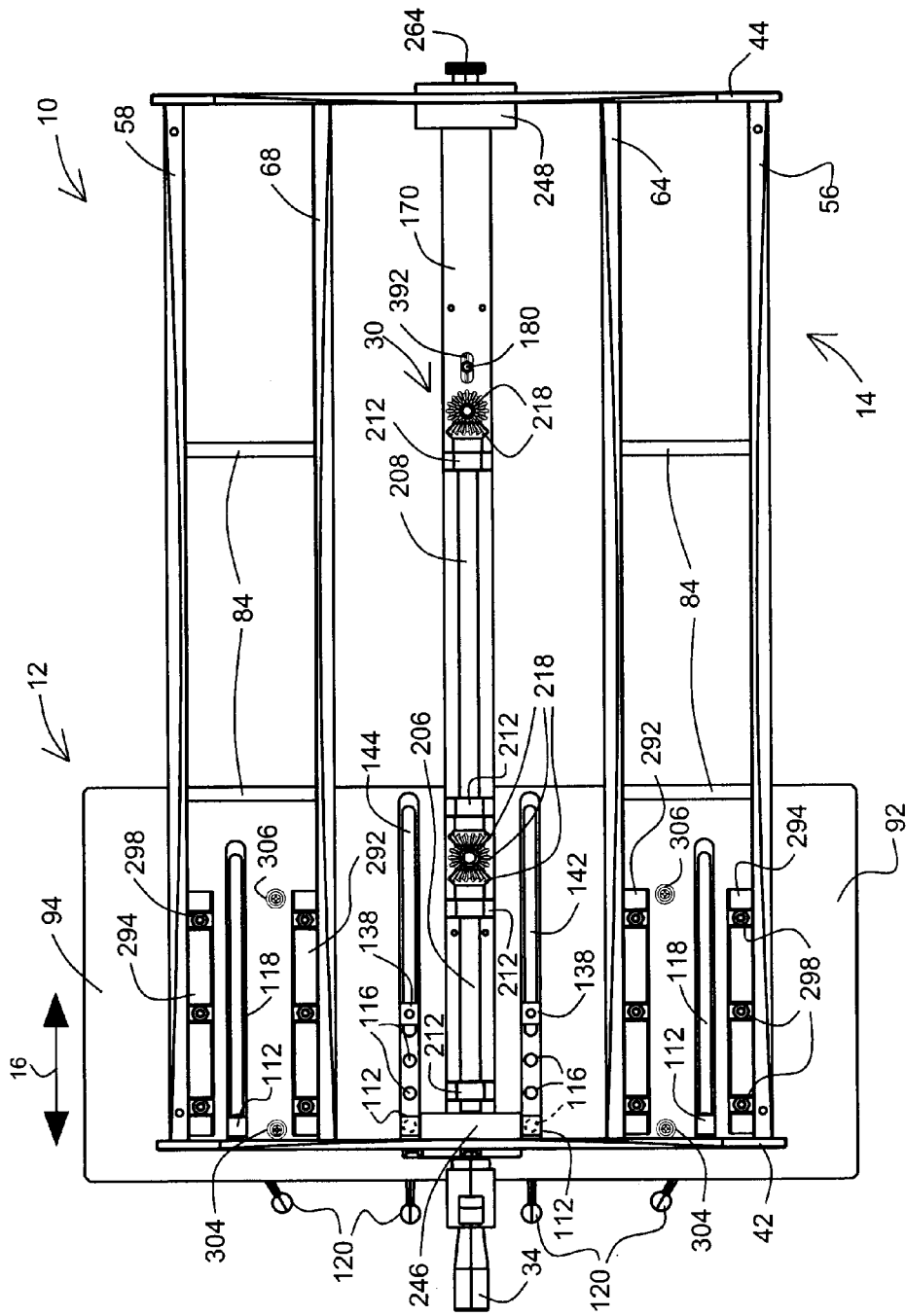
FIG. 5 is a bottom plan view of the table saw of FIG. 1.

Frame 14 includes spaced-apart front and rear face plates 42, 44 and a set of braces 46 spanning between face plates 42, 44. The ends of braces 46 are preferably seated in pockets 48 or notches (FIG. 6) milled in opposing inside surfaces of plates 42, 44, and securely fastened to plates 42, 44 via face plate screws 52 (FIG. 4). Braces 46 of frame 14 provide structural support and rigidity, and include left and right lower braces 56, 58 (FIGS. 1 and 5). Braces 46 further include two pairs of upper braces, including lateral and medial left upper braces 62, 64, and lateral and medial right upper braces 66, 68. V-shaped guideways 72, 74, 76, 78 (FIGS. 1 and 6) are formed along the length of respective upper braces 62, 64, 66, 68 and serve as ways for slide bearings 292, 294 described below with reference to FIG. 6, for guiding sled 12 along guide path 16. Each of the medial and lateral braces of the left and right opposing pairs of V-shaped guideways 72, 74 and 76, 78 comprises one-half of a dovetail way, as further described below with reference to FIG. 6. Spacer rods 84 connect opposing pairs of upper braces 62, 64 and 66, 68 at one or more places between face plates 42, 44 to maintain spacing between the facing pairs of guideways 72, 74 and 76, 78. Face plates 42, 44 and braces 46 are preferably formed of anodized aluminum alloy, although other relatively strong and rigid materials may be used for the base structure. Furthermore, while frame 14 illustrates a preferred base structure, other embodiments (not shown) may utilize a base of a different design.

Figure 2:
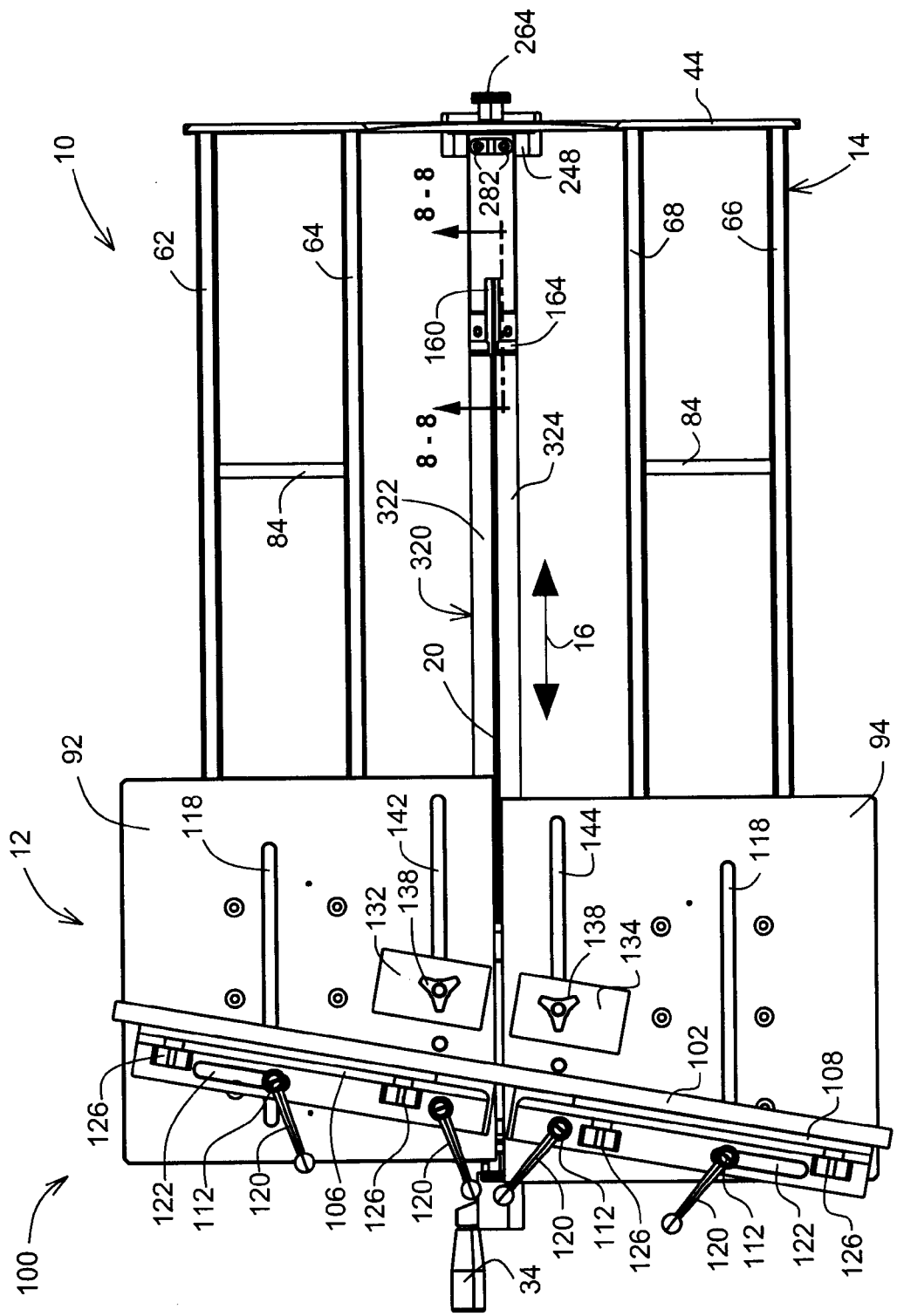
FIG. 2 is a top view of the table saw of FIG. 1 showing sled tables and fences of a sled assembly of the table saw offset for cutting at an angle.

FIG. 2 is a top plan view of table saw 10 illustrating details of left and right sled tables 92, 94 and a fence system 100 of sled 12. With reference to FIGS. 1 and 2, left and right sled tables 92, 94 are independently movable along guide path 16 but shown joined by a wooden bridge 102 that is attached to left and right fences 106, 108. Fences 106, 108 are adjustably coupled to sled tables 92, 94 via locking bolts 112, which extend through fence mounting holes 116 and slots 118 in sled tables 92, 94 and are threaded into locking handles 120 (see also FIG. 5). Multiple fence mounting holes 116 (FIG. 5) are provided in sled tables 92, 94, and at least one of the locking bolts 112 of each fence 106, 108 extends through one of the fence mounting slots 118 and a fence slot 122 in the foot of the fence. This enables fences 106, 108 to be adjustably arranged on sled tables 92, 94. Fences 106, 108 may be angled by up to 45° from normal to guide path 16, which may be useful for cutting miter joints, for example. Left and right sled tables 92, 24 may also be offset relative to each other along guide path 16 while fence system 100 is angled, as illustrated in FIG. 2; and sled tables 92, 94 may be joined by bridge 102 so as to move in unison along guide path 16. Bridge 102 is coupled to fences 106, 108 by a set of bridge locking screws 126 extending through holes in fences 106, 108 and threaded to dovetail-shaped nuts (not shown). The dovetail nuts are slidably fitted in a dovetail slot 128 (FIGS. 1 and 3) running the length of bridge 102 and facing fences 106, 108. Alternatively, sled tables 92, 94 may be decoupled and only one of them used to support a workpiece during cutting. Left and right clamps 132, 134 are adjustably mounted on respective left and right sled tables 92, 94 via clamp screws 138 extending through respective left and right clamp slots 142, 144, which allow clamps to be repositioned relative to fences 106, 108 for clamping a workpiece against sled tables 92, 94 and bridge 102 or fences 106, 108.

Figure 3:
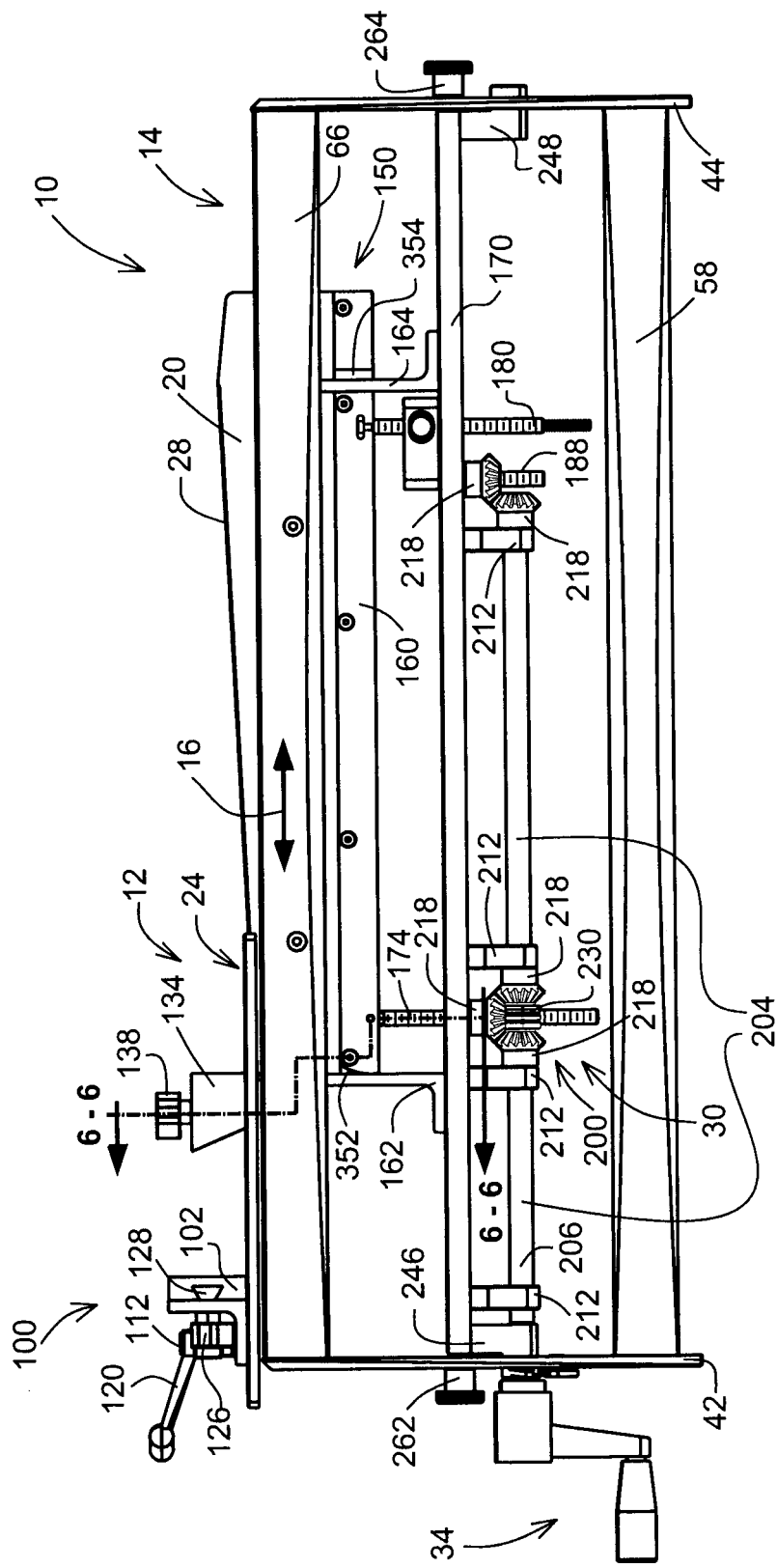
FIG. 3 is a right side elevation view of the table saw of FIG. 1.

Turning now to FIG. 3, details of blade height adjusting mechanism 30 and certain details of a blade mount subassembly 150 are illustrated. Further details of blade mount subassembly 150 are described below with reference to FIGS. 6 and 7. With reference to FIG. 3, blade 20 is mounted on a rigid spine 160 that is slidably captured between spaced-apart slotted front and rear saw guide uprights 162, 164 for movement therealong to adjust the blade height relative to sled tables 92, 94. Saw guide uprights 162, 164 are secured to a keel 170 that serves as a common platform for blade mount subassembly 150, blade 20, and blade height adjusting mechanism 30, and that enables a bevel angle of blade 20 to be adjusted, as described below with reference to FIG. 4.

Spine 160 is supported on and connected to a front leadscrew 174 proximal of front saw guide upright 162. Spine 160 is also preferably supported proximal of rear saw guide upright 164 on a pitch adjusting screw 180, further described below with reference to FIG. 8, which is carried by a pitch adjusting block 184 supported on a rear leadscrew 188. Leadscrews 174, 188 are constrained to prevent their rotation and driven for axial movement by a drive mechanism 200 of blade height adjusting assembly 30.

Drive mechanism 200 includes a drive shaft assembly 204 including a front drive shaft 206 and a rear drive shaft (transfer shaft) 208 rotatably mounted in bearing blocks (bushing blocks) 212 hung from keel 170. A gear train including a set of five bevel gears 218 couples drive shafts 206, 208 together and to respective front and rear leadscrew nuts 222, 224 (FIGS. 6 and 8) which are threaded onto respective front and rear leadscrews 174, 188. Manually turning crank 34 or an equivalent manual input device, such as a handwheel (not shown), rotates front drive shaft 206. Bevel gears 218 transfer power from front drive shaft 206 to rear drive shaft 208 and rotate leadscrew nuts 222 and 224 to move leadscrews 174, 188 axially, thereby adjusting blade height and cutting depth. Front leadscrew 174 is left-hand threaded, and rear leadscrew 188 is right-hand threaded, to accommodate the different directions of rotation of drive shafts 206, 208 imparted by the gear train. Leadscrew nuts 222, 224 rotate within flanged oil-impregnated bearings 226 or bushings (FIGS. 6 and 8) fitted in keel 170. To eliminate the need for lubrication and reduce maintenance, bearing blocks 212 and bevel gears 218 are preferably made of a low-friction, wear-resistant polymer material, such as acetal, although other materials may be utilized. A pair of blade-height limiting stop nuts 230 are threaded onto front leadscrew 174 below the bevel gear 218 that is coupled to front leadscrew nut 222, and may be locked in position by a user at a selected location along front leadscrew 174 to limit axially upward travel of front and rear leadscrews 174, 188. Stop nuts 230 thus enable a user to set a maximum blade height to achieve repeatable cut depths. In an alternative embodiment, stop nuts 230 may be threaded onto rear leadscrew 188 instead of or in addition to front leadscrew 174.

In an alternative embodiment (not shown), a blade height adjustment mechanism may be spring-loaded or otherwise driven for automatic adjustment in increments upon each stroke of sled 12 via a trigger mechanism located adjacent front plate 42 that is triggered during the return stroke of sled 12. In still another embodiment (not shown), blade cutting depth adjustment may performed by adjusting a height position of sled guideways relative to frame 14, instead of adjusting blade height.

Figure 3A:
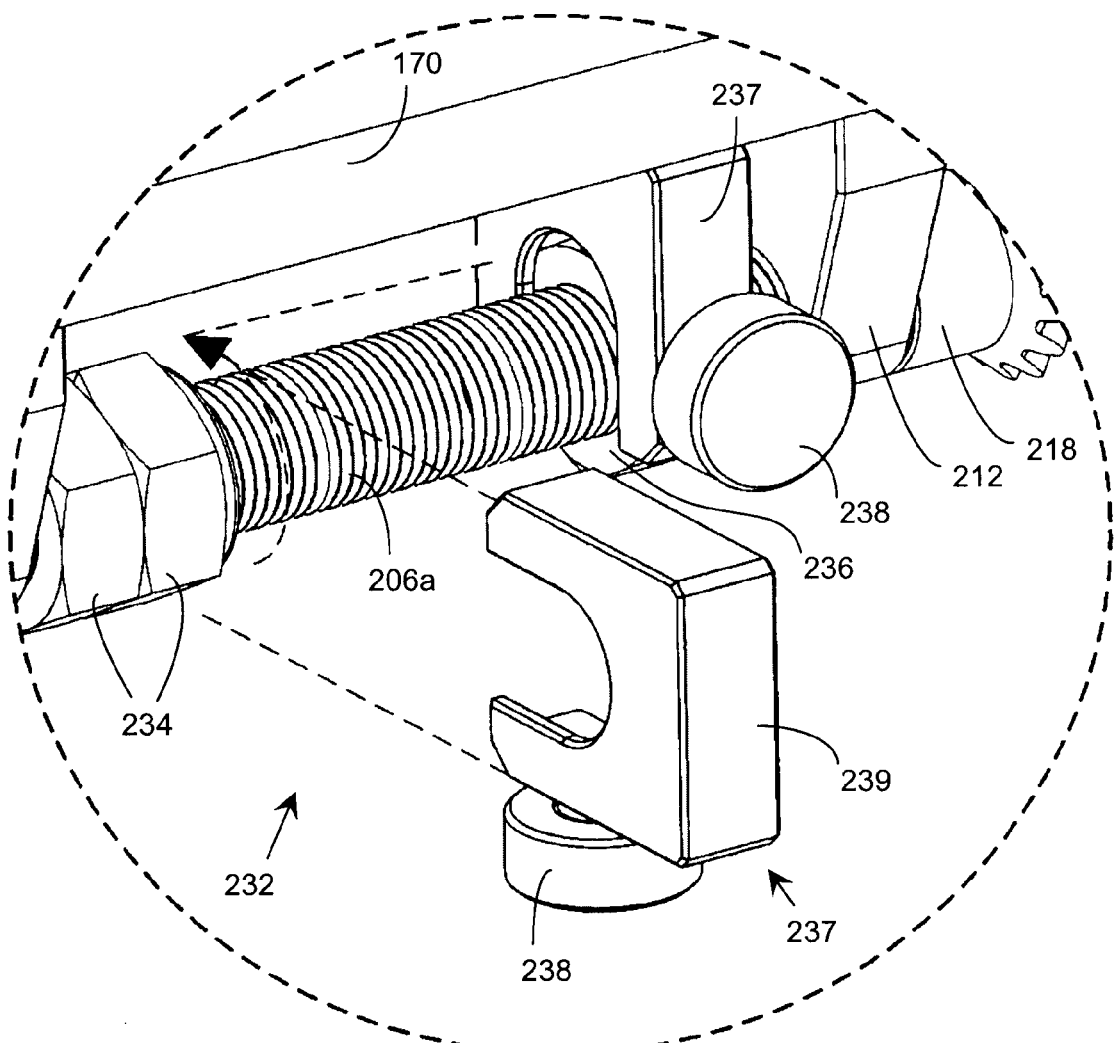
FIG. 3A is a detail view of a portion of the blade-height adjusting mechanism of FIGS. 1 and 3, showing a blade height stop mechanism according to a second embodiment.

FIG. 3A illustrates a blade-height stop mechanism 232 in accordance with a second embodiment, which may be used instead of or in addition to the stop nuts 230 on front leadscrew 174 (FIG. 3) for limiting the axial travel of the leadscrew 174, and thereby setting a maximum cutting depth of blade 20. With reference to FIG. 3A, stop mechanism 232 includes a pair of jamb nuts 234 and a traveler nut 236 threaded onto a threaded front drive shaft 206a. To limit the amount of blade height adjustment, a height stop adapter 237 is fitted onto traveler nut 236 and firmly clamped thereto via a lock screw 238 of height stop 236. Height stop adapter 237 includes a channel (mostly hidden from view in FIG. 3A) that is sized to slidably fit across flats of traveler nut 236. (Height stop adapter 237 is shown twice in FIG. 3A to illustrate how it is installed.) When height stop adapter 237 is installed, a heel 239 thereof abuts keel 170 to prevent traveler nut 236 from rotating with front drive shaft 206a. Instead, traveler nut 236 and height stop adapter 237 move longitudinally along front drive shaft 206a when drive shaft 206a is rotated. The maximum height of blade 20 is set by adjusting the position of jamb nuts 234 relative to the initial position of traveler nut 236 and height stop adapter 237. When blade height travel limitations are not required, height stop adapter 237 can be removed to avoid thread wear.

FIG. 4 is a front elevation view of table saw 10 showing detail of a blade bevel angle adjusting mechanism 240 of table saw 10. With reference to FIGS. 3 and 4, blade bevel angle adjusting mechanism 240 includes a pair of front and rear traveler blocks 246, 248 supporting keel 170 at its ends on frame 14. Traveler blocks 246, 248 are formed of a low-friction, wear-resistant material such as acetal and slidably seated in respective front and rear arcuate guideway slots 252, 254 formed in respective front and rear plates 42, 44 for movement therealong to adjust a bevel angle of blade 20. Front drive shaft 206 is journaled in front traveler block 246 and coupled to crank 34 via a hole through front traveler block 246.

In FIG. 4, the bevel angle of blade 20 is shown adjusted to +45° relative to center. Arcuate guideway slots 252, 254 are preferably long enough to allow movement of keel 170 along at least a 90-degree arc, thereby allowing the bevel angle of blade 20 to be adjusted at least +/−45° from center. Front and rear knurled locking knobs 262, 264 extend through arcuate lock-down slots 266 in front and rear face plates 42, 44 and are threaded into opposing front and rear ends of keel 170. Loosening locking knobs 262, 264 allows adjustment of keel 170 along guideway slots 252, 254 for adjustment of the bevel angle, while tightening locking knobs secures keel 170 in a desired location and provides a rigid connection between keel 170 and frame 14. The centers of the arcs of guideways 252, 254 and lock-down slots 266 fall on an axis extending in the plane of the table surface 24 along the center of the gap between the left and right sled tables 92, 94, designated as location (0,0), which is intersected by blade 20. Blade height adjusting mechanism 30 (FIGS. 1 and 3) moves with keel 170, and can therefore operate at any bevel angle setting.

One or more (and preferably multiple) tilt indicators or stops 270 may be positioned along an arcuate stop slot 274 adjacent front arcuate guideway slot 252 to limit the travel of front traveler block 246 and keel 170. Tilt stops 270 may be slidable along stop slot 274 and secured at a desired location to facilitate repeatably returning blade 20 to a desired bevel angle. As illustrated in FIG. 4, tilt stops 270 include retractable stop fingers 272, which can be flipped down and clear of traveler block when not needed (as illustrated by stop finger 272'), and flipped back up again when the stop location (i.e., the blade bevel angle) is again needed. In an alternative embodiment (not shown), tilt stops may be mounted on back plate 44 in addition to or instead of front plate 42. Compound miter joints may be easily made by setting the desired angle of fences 106, 108 and the desired bevel angle via blade bevel angle adjusting mechanism 240.

Keel 170 is secured to each of the traveler blocks 246, 248 via a pair of keel screws 282 (FIG. 2) that extend through slightly slotted holes in keel 170. The slotted holes enable keel 170 and blade 20 to be precisely aligned with guide path 16 during assembly of table saw 10, and before tightening keel screws 282. In a setup alignment operation, keel screws 282 are installed finger-tight (loosened slightly), to allow keel to float laterally on traveler blocks 246, 248. Bevel angle is set to 0° (blade held vertical). Blade 20 rides within a kerf in bridge 102 while sled 12 is drawn along blade 20 to thereby align blade 20 with guide path 16. Keel screws 282 are then tightened. The alignment operation may require several strokes of sled 12. For example, keel screws 282 may need to be tightened progressively while sled 12 is repeatedly drawn back and forth along blade 20, to ensure precise alignment of blade 20 with guide path 16.

Figure 6:
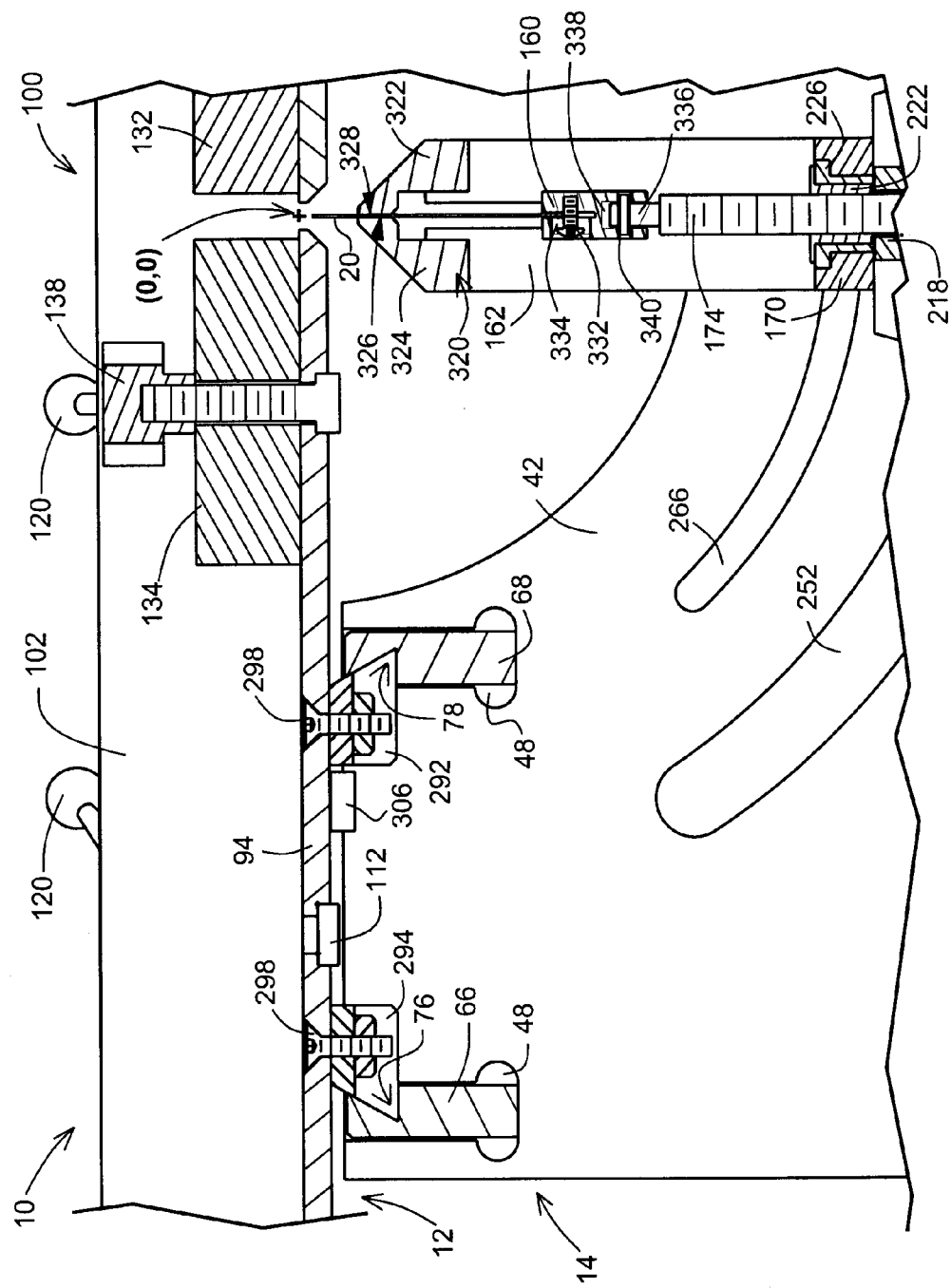
FIG. 6 is a partial section view taken along line 6-6 of FIG. 3, showing detail of sled guides, a workpiece clamp, blade guides, and a blade height adjusting mechanism of the table saw of FIG. 1.

FIG. 6 is a partial section view taken along line 6-6 of FIG. 3, and illustrates detail of V-guides for guiding sled 12 on frame 14. With reference to FIGS. 5 and 6, pairs of fixed and adjustable slide bearing blocks 292 and 294 (also referred to as planar glides) are attached to an underside of each of left and right slide tables 92, 94 via screws 298. Slide bearing blocks 292, 294 are preferably made of a low-friction, wear-resistant polymer material, such as NYLATRON lubricant-filled nylon, available from Quadrant Engineering Plastic Products, Inc., Reading, Pa., USA. Adjustable slide bearing blocks 294 may be adjusted outwardly (laterally) during assembly before screws 298 are tightened, so that each pair of slide bearing blocks 292, 294 cooperates to retain sled tables 92, 94 snugly, but slidably in respective pairs of guideways 72, 74 and 76, 78, and to precisely guide sled tables 92, 94 along linear guide path 16. Front and rear rubber bumpers 304, 306 (FIGS. 5 and 6) extend downwardly from sled tables 92, 94 to limit the forward and rearward travel of sled tables 92, 94 by bumping against respective front and rear plates 42, 44. In alternative embodiments (not shown), different types of linear guides may be utilized, such as roller bearings riding above and below upper braces 62, 64, 66, 68 forming raceway rails for such roller bearings. Many other guide configurations and materials may also be used. Further, in other embodiments (not shown), guideway and guide path 16 may be made curvilinear, for use with curved workpieces and/or curved blades, for cutting along a curve. Accordingly, the term "linear" as used in the claims is intended to encompass curvilinear unless otherwise stated.

Figure 7:
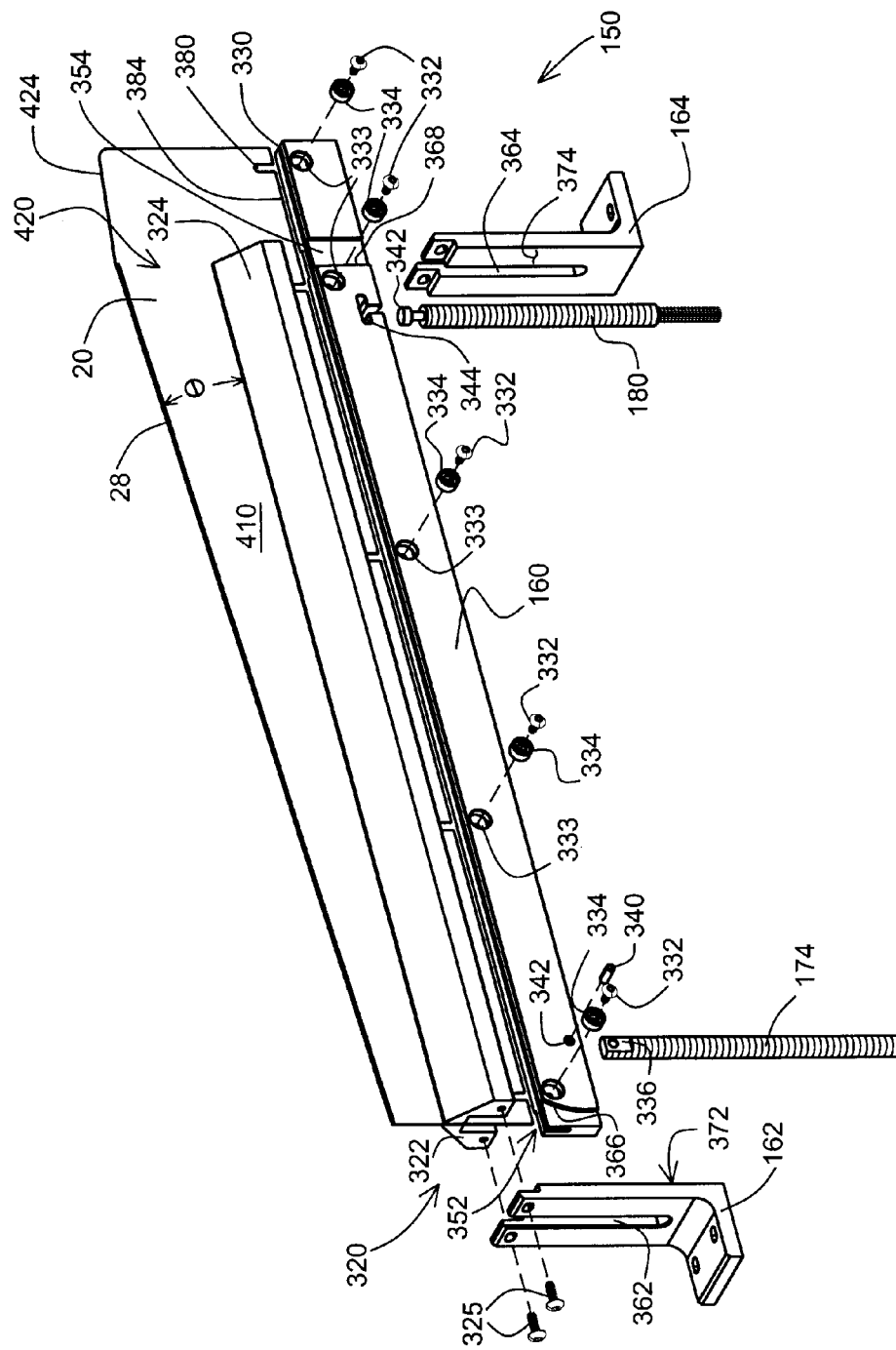
FIG. 7 is an exploded trimetric view of a blade supporting spine and guide assembly of the table saw of FIG. 1.

Turning now to FIGS. 6 and 7, details of blade mount subassembly 150 and blade guides will be described. As mentioned above, blade 20 is mounted in spine 160, which is slidably captured between saw guide uprights 162, 164. A blade guide 320 includes a left blade guide bar 322 and a right blade guide bar 324, each attached at its ends to uprights 162, 164 via blade guide mounting screws 325. Left and right blade guide bars 322, 324 pinch blade 20 between opposing left and right blade guide surfaces 326, 328 (FIG. 6) thereof, such that left and right blade guide surfaces 326, 328 continually bear against opposite faces of blade 20 and provide an interference fit during cutting and during adjustment of blade height, bevel angle, and inclination (pitch angle). Blade guide bars 322, 324 and front and rear saw guide uprights 162, 164 are sized and shaped to provide spring action, and are preferably formed of anodized aluminum or another metal with a relatively high Young's modulus. Blade guide bars 322, 324 preferably have a rooftop shape that overhangs spine 160 and certain components of blade height adjusting mechanism 30 to inhibit sawdust from fouling blade height adjusting mechanism 30. The rooftop shape also provides relief to allow blade 20 to be angled via blade bevel adjusting mechanism 240 (and preferably canted at least +/−45° without interfering with tables 92, 94, while supporting blade 20 as close as possible to the bottom of the cutting zone (0,0), for example within a centimeter. Blade guide 320 (including blade guide bars 322, 324) preferably extends along a substantial portion of the length of blade 20, and particularly along a substantial portion of blade 20 in the region of working edge 28. In the embodiment shown, blade guide 320 does not support blade 20 along a blade extension 420 (FIG. 9) thereof. Blade extension 420 receives some support from spine 160 and generally does not require the added support of blade guides 320 because blade extension 420 is not a load-bearing section of blade 20.

Blade 20 is seated in a longitudinal groove 330 in spine 160 and attached to spine 160 with blade mounting screws 332 that extend through spaced-apart holes 333 in spine 160 and through slots 380 along a back 384 of blade 20. Groove 330 is wide enough to accommodate blades of different thicknesses. In one embodiment, groove 330 is approximately 1.5 mm wide. Cap washers 334 on blade mounting screws 332 bear against blade 20 and press blade 20 against an inner left surface of groove 330. In one alternative embodiment (not shown), a pair of blades in side-by-side configuration or a special double-edged blade may be installed in spine 160, or in a modified spine having a larger groove and a blade spacer, for making decorative cuts.

A flattened (keyed) end 336 of front leadscrew 174 is fitted in a blind rectangular slot 338 in spine 160 (FIG. 6) and pivotably secured to spine 160 with a spring pin 340. Blade 20 and spine 160 may be pivotably adjusted about spring pin 340 in response to manual adjustment of pitch adjusting screw 180 to change the inclination of working edge 28 of blade 20 (pitch angle), as described below with reference to FIG. 8. Pitch adjusting screw 180 includes a head 342 that is mated with a T-slot 344 formed in spine 160.

Spine 160 includes front notches 352 and rear notches 354 along its sides that mate with guide slots 362, 364 in respective front and rear saw guide uprights 162, 164. Notches 352, 354 include outwardly-facing cylindrical bearing surfaces 366, 368 centered on spring pin 340, which ride against inwardly-facing thrust bearing surfaces 372, 374 of saw guide uprights 162, 164. Bearing surfaces 366, 368, 372, 374 work to resist longitudinal movement of blade 20 during cutting strokes and return strokes of a workpiece along blade 20. Mounting slots 380 along back 384 of blade 20 also cooperate with blade mounting screws 332 to provide load-bearing surfaces along the length of blade 20 where it attaches to spine 160. Using numerous mounting slots 380 distributes thrust loads within blade 20 and helps prevent blade 20 from bending or breaking under load. Slots are desirably spaced approximately 6 cm to approximately 15 cm apart, and preferably spaced approximately 10 cm to approximately 12 cm apart. Other blade mounts may also be utilized for distributing loads along the length of blade 20. For example, one alternative embodiment (not shown) may utilize a clamp bar that is tightened against blade 20 along the entire length of back 384.

Figure 8:
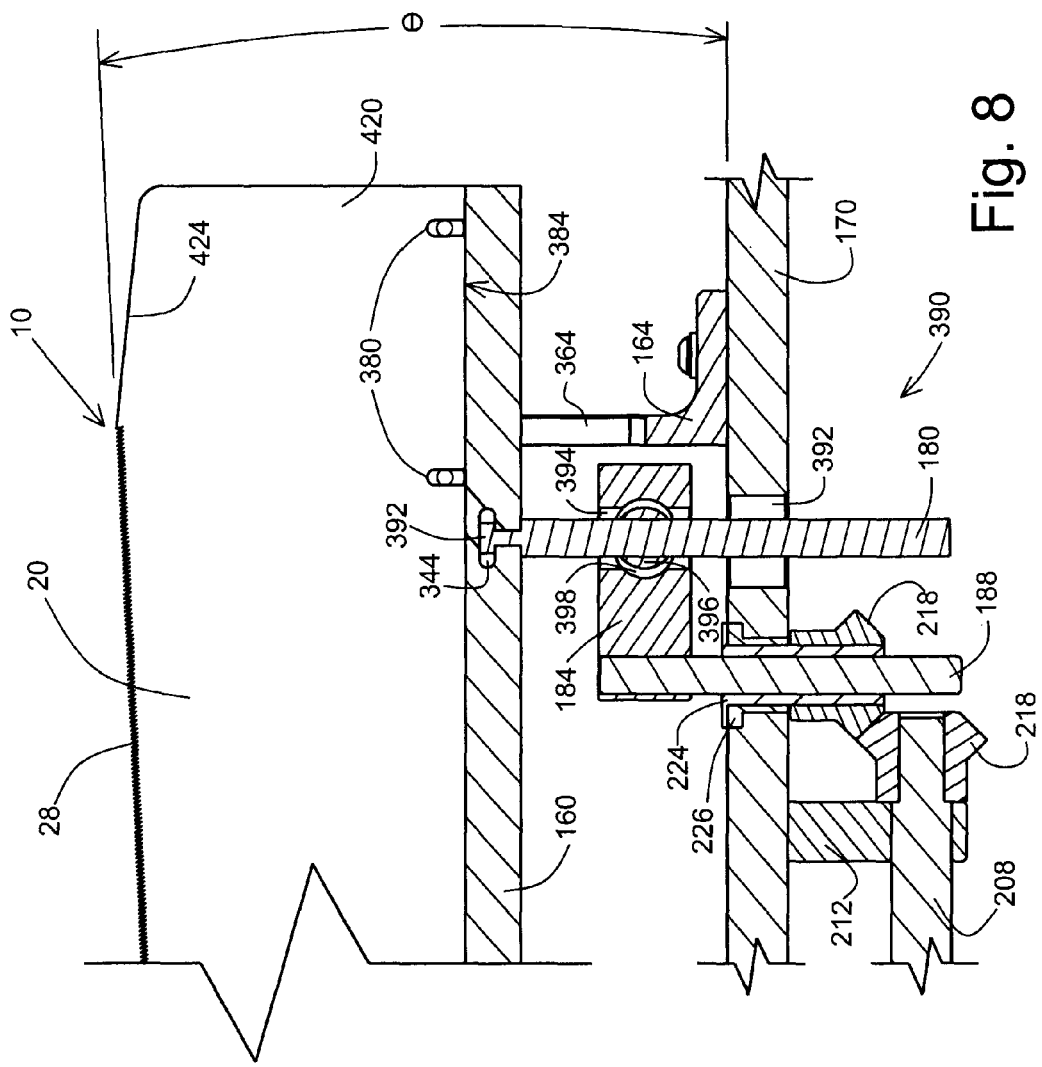
FIG. 8 is a section view taken along line 8-8 of FIG. 2 showing detail of a blade pitch adjusting mechanism of the table saw of FIG. 1.

FIG. 8 is a sectional detail view taken along line 8-8 of FIG. 2, showing detail of a rear leadscrew 188 and leadscrew nut 224, and a pitch adjusting mechanism 390 for adjusting an inclination angle θ of working edge 28 of blade 20 relative to blade guide 320 and other features of table saw 10, and generally defining how aggressive and deep the blade will cut when a workpiece is conveyed over it. Pitch adjusting mechanism 390 includes pitch adjusting screw 180, described above, which extends through slots 392, 394 in keel 170 and pitch adjusting block 184, respectively, and is threaded through a barrel nut 396 that rides in a slotted hole 398 in pitch adjusting block 184 which intersects slot 394. Slots 392, 394, slotted hole 398, and barrel nut 396 provide a pivoting threaded mount that accommodates changes in the angle of blade 20 and pitch adjusting screw 180. Adjustable blade inclination allows a user to control the cutting load of the saw blade 20 and the depth of each cutting stroke, facilitating efficient cutting of workpieces having different hardness, densities, and sizes. When table saw 10 is in use, the blade inclination is preferably set only so steep as needed without exceeding the cutting capacity of blade 20, thereby making every tooth of blade 20 work during each cutting stroke.

Figure 9B:
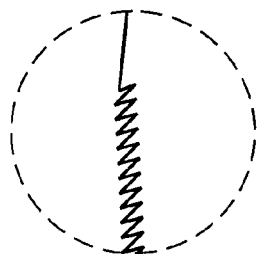
FIG. 9B is an enlarged detail view of region 9B-9B of FIG. 9.
Figure 9:
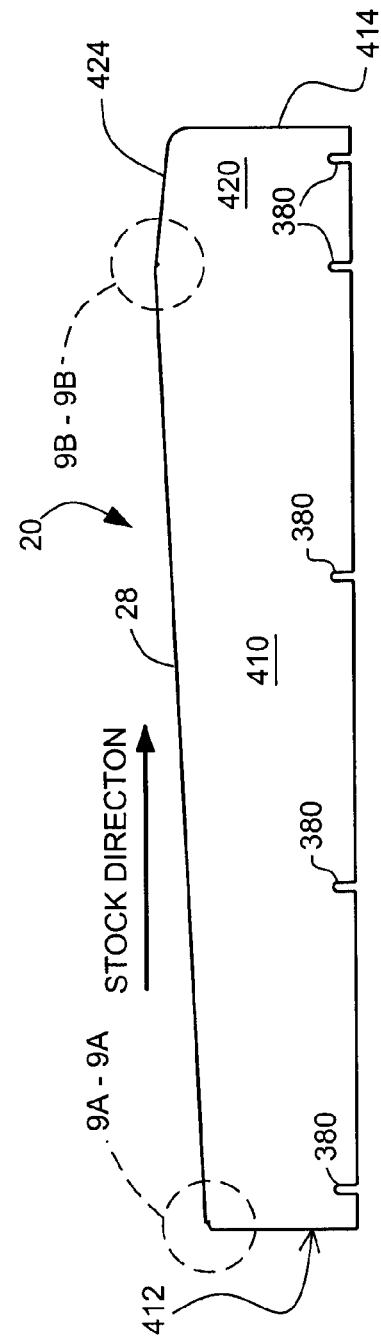
FIG. 9 is a side elevation view of a saw blade for the table saw of FIG. 1.

FIG. 9 is a side elevation view of blade 20 according to a preferred embodiment, for use with a manual table saw or other cutting device of the kind described herein. Blade 20 includes fine teeth along an inclined working edge 28 (cutting edge) that extends lengthwise along a body 410 of blade 20 and ends between opposing front and rear (distal) ends 412, 414 of body 410. A blade extension 420 extends beyond working edge 28 to distal end 414 of blade 20, and includes a relief edge 424 that extends away from working edge 28 toward distal end 414 and declines toward back 384 of blade 20 opposite working edge 28. When blade 20 is installed in a cutting device of the kind described above, blade extension 420 extends beyond the maximum travel of a workpiece-pushing surface of sled 12, such as bridge 102 (or fences 106, 108 when bridge 102 is not used), so that at least a portion of blade extension 420 remains in the kerf at the end of a full cutting stroke, preventing blade 20 from jamming against the workpiece upon a return stroke of sled 12.

A nominal design for blade 20 has a height dimension of approximately 56 mm at its front end 412, a maximum blade height at the distal end of working edge 28 (at detail 9B-9B) of approximately 74 mm, an overall length of approximately 434 mm, and a blade extension 420 that is approximately 52 mm long. The depth of mounting slots 380 is approximately 6.5 mm from the back 384 of the blade to the centerline of the slot radius. The blade dimensions may be varied to accommodate different materials, cutting teeth types, and table saw designs. For example, blade extension 420 may be shorter or longer, but preferably at least 3 centimeters (cm) and more preferably approximately 5 cm (as shown) or longer. The angle of relief edge 424 of blade 20 is selected so that at a maximum usable inclination of working edge 28, relief edge 424 is still oriented so as to be slightly declining toward table surface 24 (FIG. 2) as relief edge 424 extends away from working edge 28, to prevent interference with the workpiece as the kerf rides over relief edge 424. As illustrated in FIG. 9B, the transition from the working edge 28 to the relief edge 424 should be smooth to prevent snagging the kerf. In a preferred embodiment, relief edge 424 is declined at an angle of approximately 5 to 8 degrees relative to back 384 of blade 20. In other embodiments, relief edge may be declined to a lesser or greater extent, for example in the range of approximately 3 to 12 degrees.

Figure 9A:
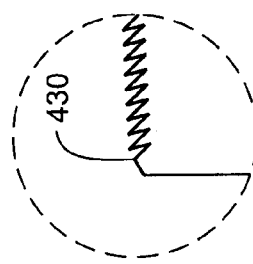
FIG. 9A is an enlarged detail view of region 9A-9B of FIG. 9.

The angle of inclination of working edge 28 of blade 20 relative to back 384 may be in the range of approximately 2 to 4 degrees, for example, and preferably in the range of approximately 2.5 to 3.0 degrees. In the nominal embodiment illustrated, the angle of inclination (pitch angle) of working edge 28 is approximately 2.7 degrees relative to back 384 of blade 20. In other embodiments, the pitch angle of working edge 28 may range from 0.0 degrees to 5 degrees relative to back 384 of blade 20. As illustrated in FIG. 9A, a small lead-in 430 is provided between front end 412 and the teeth of working edge 28 to prevent damage to the first teeth of working edge 28. In the nominal embodiment shown, lead-in 430 is approximately 2.5 mm long and has a lead-in angle greater than the inclination angle of working edge and preferably approximately 10 to 15 degrees relative to back 384. The length of working edge 28 may be greater than approximately 30 cm long, and is preferably on the order of approximately 35-38 cm long. In longer table saw designs, the blade 20 may have a working edge that is significantly longer—for example, in the range of 40-70 cm.

Saw blades according to a preferred embodiment are of a specialized design that utilizes some features of certain varieties of Japanese saws (nokogiri, 鋸), such as a dozuki (胴付鋸) or kataba (片刃鋸), including fine-pitch teeth and a very thin body 410 to reduce friction. The thickness of body 410 may be in the range of approximately 0.15 mm to approximately 1.0 mm or more (approximately 0.006 inch to approximately 0.04 inch) and preferably on the order of approximately 0.2 mm to approximately 0.5 mm (approximately 0.008 inch to approximately 0.020 inch). Crosscut teeth having a tooth spacing of approximately 0.08 mm to approximately 0.09 mm (pitch of approximately 28 to 32 teeth per inch (tpi)) are preferable, although somewhat finer or less-fine pitches may also be used.

The present inventor has found that a blade having a blade body thickness of approximately 0.3 mm and Japanese style crosscut teeth with a tooth spacing of approximately 0.9 mm (28 tpi) and approximately 420 total teeth is suitable for general purpose use and woodworking. Such blades are also particularly well suited for small stock. For example, table saw 10 according to the preferred embodiment shown was used to cut a bridle joint in wooden drink stir sticks having a material thickness of approximately 0.05 inch thick (approximately 1.3 mm). The kerf (material removed) was approximately 0.020 inch (approximately 0.5 mm). Table saw 10 may be used to cut hardwood stock of at least 6 inches (152 mm) in width and 1.75 inches (45 mm) thick.

Alternative types of blades useful with table saw 10 include blades with rip teeth, a combination of rip teeth and crosscut teeth, and hybrid teeth designs having different pitches or variable pitches, different rake angles, and blades of different thicknesses, lengths, heights, and cutting profiles.

Relief edge 424 of the blade extension 420 need not include teeth and is preferably smooth so that blade extension 420 may serve as a convenient reference surface to accurately set the bevel angle of blade 20 relative to table surface 24 using a contact gage, such as a square, bevel, protractor, etc. (The blade teeth in other portions of blade 20 typically have a set that may interfere with the gage and prevent the face of blade body 410 from lying flush against the gage.)

Blade 20 is preferably made from high-carbon tool steel having a hardness in the range of approximately 58 to 62 Rockwell C (Rc) and may include impulse hardened teeth having a greater hardness, for example in the range of 66 to 68 Rc. In some embodiments, blade 20 may be made of softer or harder steel or other materials, such as ceramic. In further embodiments the teeth may be tipped with carbide or another hard material. Blade 20 may be plated or coated with a low-friction coating such as TEFLON, a hard electro-deposited coating, or a ceramic coating, to further resist wear and/or reduce friction resistance during the cutting stroke.

Manual table saws according to the present disclosure may eliminate the need for electric power, hearing protection, and dust collection equipment, while providing excellent precision and reduced setup time over conventional saw equipment.

In accordance with yet another embodiment (not shown), a cutting device similar to manual table saw 10 may include a spring-biased spine or other special blade mount for holding a special blade or inscriber adapted to cut or score hard workpiece materials, such as metal, glass, or ceramic, for example. In these embodiments, the spring or other biasing device urges the blade toward the workpiece, absorbs chatter, and may help dampen vibration.

It will be obvious to those having skill in the art that many changes may be made to the details of the above-described embodiments without departing from the underlying principles of the invention. The scope of the present invention should, therefore, be determined only by the following claims.

The invention claimed is:

1. A cutting device, comprising:
a base;
a sled supported on the base and guided for reciprocating linear movement relative to the base along a linear guide path, the sled including a sled surface for supporting a workpiece thereon;
an elongate spine supported on the base below the sled surface and extending along the guide path;
an elongate blade rigidly mounted on the spine in alignment with the guide path, the blade having an elongate sloped working edge and an elongate back opposite the working edge, the back of the blade abutting the spine and rigidly mounted thereto, the working edge of the blade extending lengthwise along the blade and being inclined away from the sled surface when the cutting device is in use from a minimum blade height at a proximal end of the working edge to a maximum blade height at a distal end of the working edge opposite the proximal end, at least a portion of the working edge and the distal end extending beyond the sled surface when the cutting device is in use;

the sled being manually movable along the guide path relative to the blade while the blade is held stationary relative to the base, such that a workpiece, when supported on the sled surface, is conveyed against the working edge of the blade, thereby cutting the workpiece; and the spine being selectively movable relative to the sled surface and transversely of the guide path to thereby position the working edge of the blade further beyond the sled surface, which increases a cutting depth of the blade.

2. The cutting device of claim 1, further comprising a blade height adjusting mechanism supported on the base, the blade height adjusting mechanism including a drive mechanism coupled to the spine for moving the spine and the blade relative to the base transversely of the guide path, thereby adjusting the cutting depth of the blade.

3. The cutting device of claim 2, wherein the drive mechanism includes:
at least one leadscrew attached to the spine; and
a drive shaft assembly manually driven via a crank or handwheel of the drive mechanism, the drive shaft assembly operably coupled to the leadscrew for moving the leadscrew along its axis and thereby adjusting the cutting depth of the blade.

4. The cutting device of claim 3, further comprising an adjustable stop mechanism for limiting the axial travel of the leadscrew, thereby setting a maximum cutting depth of the blade.

5. The cutting device of claim 1, further comprising a blade pitch adjusting mechanism including a pivot mount on which the spine is supported for pivoting movement about a pitch axis extending perpendicular to the blade, the pitch adjusting mechanism being manually operable for changing an inclination angle of the working edge of the blade relative to the guide path.

6. The cutting device of claim 1, further comprising a blade guide supported on the base and including first and second guide surfaces that bear against opposite faces of the blade, the blade guide extending along a substantial portion of a length of the blade to provide lateral support for the blade.

7. The cutting device of claim 6, further comprising a movable keel on which the blade guide is mounted, the movable keel being supported on the base for movement along an arcuate guideway formed in the base, the spine being supported on the keel so that moving the keel along the arcuate guideway changes a bevel angle of the blade relative to the sled.

8. The cutting device of claim 7, wherein the arcuate guideway allows movement of the keel along at least a 90-degree arc, thereby allowing the bevel angle of the blade to be adjusted at least +/−45 degrees from center.

9. The cutting device of claim 7, further comprising at least one retractable stop selectively positionable along the arcuate guideway to limit the travel of the keel along the arcuate guideway and thereby facilitate repeatably returning the blade to a desired bevel angle established by the stop.

10. The cutting device of claim 7, further comprising a device for locking the keel in a desired position relative to the base to set the bevel angle.

11. The cutting device of claim 1, further comprising:
a fence adjustably mounted on the sled, the fence providing support for the workpiece during cutting thereof; and
a locking mechanism for securing the fence to the sled at a desired position and angle on the sled surface.

12. The cutting device of claim 1, wherein the sled includes at least one clamp for securing a workpiece to the sled.

13. The cutting device of claim 1, wherein the sled includes first and second sled tables, each sled table being independently movable along the guide path.

14. The cutting device of claim 13, further comprising a bridge connecting the sled tables so that the sled tables move along the guide path in unison.

15. The cutting device of claim 1, wherein the blade is retractable below the sled surface when not in use.

16. The cutting device of claim 1, wherein the blade has a thickness of between approximately 0.2 millimeters and approximately 0.5 millimeters.

17. The cutting device of claim 1, wherein the blade includes a set of crosscut teeth formed along the working edge of the blade.

18. The cutting device of claim 1, further comprising plastic slide bearings for guiding the sled.

19. The cutting device of claim 1, wherein the working edge is inclined between 2 and 4 degrees relative to the back of the blade along the entire length of the working edge.

20. The cutting device of claim 1, wherein the blade includes a blade extension extending to a far end of the blade, the blade extension having a relief edge extending away from the distal end of the working edge toward the far end of the blade and declining toward the back of the blade beyond the distal end of working edge.

21. The cutting device of claim 20, wherein the relief edge is devoid of cutting teeth.

22. The cutting device of claim 5, wherein the blade pitch adjusting mechanism further includes a pitch adjustment screw spaced apart from the pivot mount along the direction of the guide path and coupled to the spine to rotate the spine about the pitch axis and thereby adjust an inclination angle of the spine and the inclination of the working edge relative to the guide path.

23. The cutting device of claim 22, wherein the pitch adjustment screw is mounted on and movable with a blade height adjusting mechanism that is manually adjustable to move the spine and the blade transversely of the guide path along a plane of the blade to thereby adjust the cutting depth of the blade.

* * * * *